July 26, 1938. E. G. CARROLL 2,124,762
BRAKE
Filed June 10, 1935
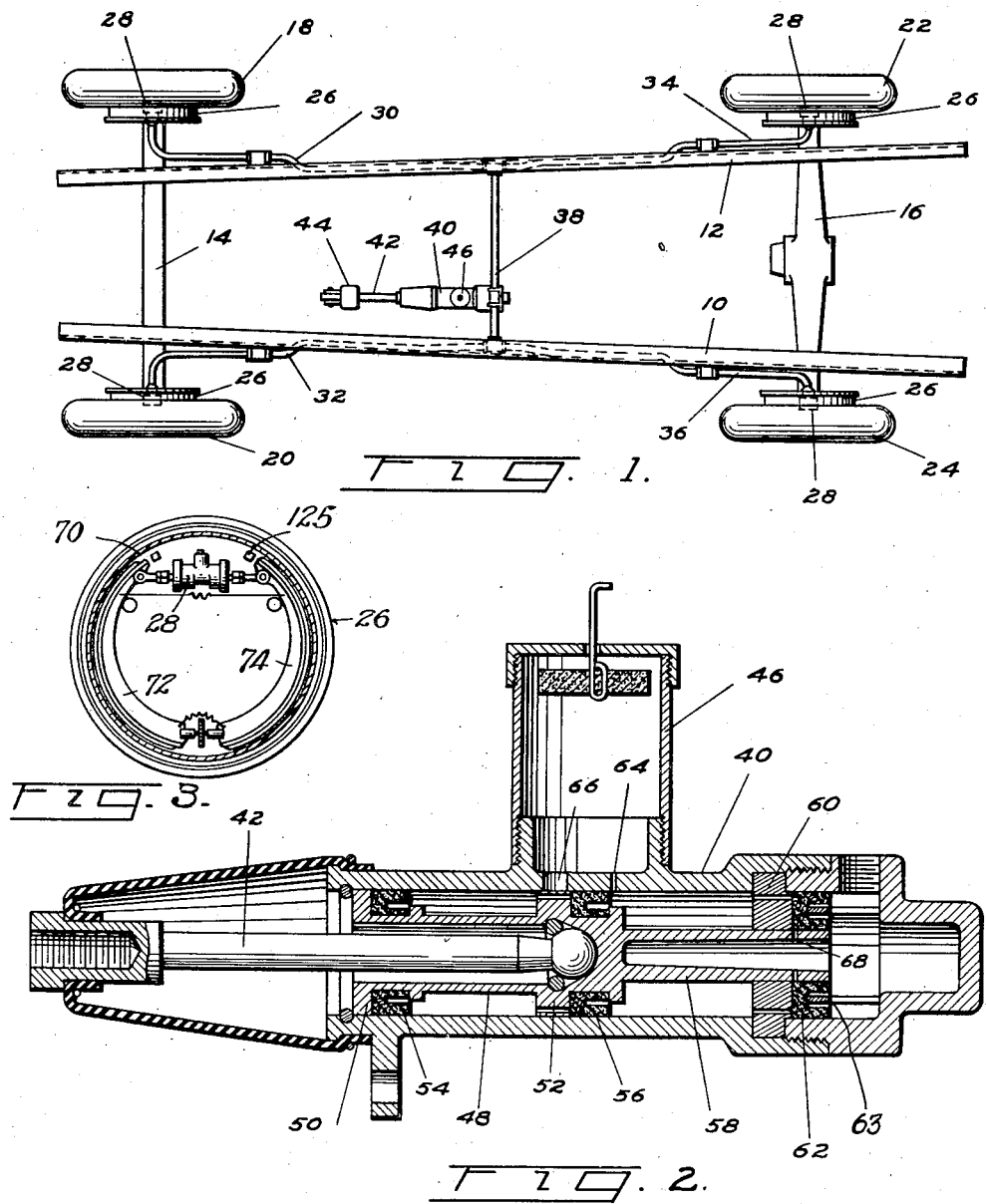
INVENTOR.
Eugene G. Carroll
BY
Jerome R. Cox
ATTORNEY Patented July 26, 1938

2,124,762

UNITED STATES PATENT OFFICE 2,124,762

BRAKE

Eugene G. Carroll, Los Angeles, Calif., assignor to Bendix Aviation Corporation, South Bend, Ind., a corporation of Delaware Application June 10, 1935, Serial No. 25,720

4 Claims. (Cl. 188—152)

This application discloses subject matter similar to that disclosed in Carroll and Taylor application Serial Number 612,137, filed May 18, 1932.

The invention relates to brake apparatus and is shown as applied to a hydraulic brake system.

One of the objects of this invention is to provide means, in combination with the brake and a brake actuator, to transmit to the brake an applying force at the brake actuator and thereafter acting to maintain the force applied to the brake by a predetermined lesser applying force at the brake actuator and acting to reduce the force applied to the brake when said lesser applying force is reduced.

Further objects and features of the invention will be apparent after a reading of the subjoined specification and claims and after a consideration of the attached drawing, in which:

Figure 1 is a plan view of a chassis of an automobile equipped with a braking system illustrating my invention;

Figure 2 is a view in vertical section and on an enlarged scale showing the master cylinder of Figure 1; and Figure 3 is a view in vertical section of a complete brake utilizing my invention.

In Figure 1 there is shown a chassis of an automobile formed with side rails 10 and 12, a front axle 14, a rear axle 16, front wheels 18 and 20 supporting the front axle 14, and rear wheels 22 and 24 supporting the rear axle 16. The wheels 18, 20, 22 and 24 are provided with brakes 26 adapted to be operated by wheel cylinders 28 to which liquid under pressure is supplied by branch conduits 30, 32, 34, 36 and a main conduit 38. The fluid is forced through said conduits by means of a master cylinder 40 which is operated through a piston rod 42 by means of a foot pedal 44.

The master cylinder 40 is provided with a reservoir 46 for a reserve supply of fluid and with a plunger 48. The plunger 48 is formed with a pair of spaced pistons 50 and 52 provided with annular cup packings 54 and 56 respectively and is provided with a forwardly extending concentric projection 58. The cylinder is also provided with a fixed head 60 having associated therewith an annular cup packing 62. The forward end of the projection 58 extends through the head 60 and the packing 62. The packing 62 may be prevented from substantial movement and held in place by any convenient means. As shown a tube 63 is utilized which contacts at its forward end with the front of the cylinder and at its rear-ward end seats within the annular groove formed in the packing, thus preventing the packing from moving far in advance of the head 60. The cylinder wall is formed with a constricted port 64 normally positioned in advance of the cup packing 56 and with a relatively large opening 66 normally covered by the piston 52, both said port 64 and said opening 66 leading to the reservoir 46. The forward end of the projection 58 is formed adjacent to the rear end of the cup 62 with a plurality of ports such as 68 by which liquid may escape from the system ahead of the cup 62 to the portion of the cylinder rearwardly thereof and thus may escape through the port 64 back to the reservoir to compensate the system for temperature changes.

Each wheel cylinder 28 is positioned in a drum 70 and is connected to brake shoes 72 and 74. Embossments 125 on the backing plate may serve to limit the circumferential movement of the shoes 72 and 74.

In the operation of the structure disclosed, pressure upon the pedal 44 acts through the piston rod 42 to move the piston 48 forward thus cutting off the port 64 and the port 66. Liquid trapped ahead of the cup 62 is forced to the brakes by means of the projection 58 and that trapped ahead of the piston cup 56 but rearwardly of the cup 62 is forced past the cup 62 and thus also to the brakes.

Inasmuch as the cup 62 prevents liquid from passing the head 60, assuming that the pedal is held stationary, the braking torque does not react upon the piston 52 and the cup 56 but is taken solely upon the small diameter of the forward projection 58. Therefore a relatively small force exerted upon the pedal is able to hold the brake. At the same time, inasmuch as some force reacts upon the pedal through the projection 58, the brake is entirely controllable. The embossments 125 prevent abnormal movement of the shoes.

Upon release of the pedal the projection 58 is allowed to return and thus reduces the force applied to the brake as the lesser applying force is reduced. Eventually the plunger 48 returns to the released position as shown. The liquid ahead of the head 60 may then flow through the port 68 around the rear of the packing 62 and through the longitudinal ports in the head 60 to the rear thereof. Then it may flow through the port 64 to the reservoir 46. Similarly, liquid may flow forward or rearward along the same path at any time when the ports are in the released position shown in order to compensate for changes in volume due to temperature changes.

Of course, it is to be understood that the packing 62 is made of rubber or some similar substance compressed within the diameter of the cylinder so that while liquid may readily find its way from the grooves 68 around the rear thereof, the packing will prevent the passage of liquid rearward around its sides. Moreover, the central opening in the head 60 does not form a tight fit with the extension 58 and liquid passing through the ports 68 may pass rearwardly through the central opening in the head 60.

It is to be understood that the embodiment of my invention described above is for the purpose of illustration only and various changes may be made therein without departing from the spirit and scope of the invention.

I claim:

1. In a vehicle, the combination of a vehicle frame, a brake, a brake actuator and means connected to the frame interposed between the brake actuator and brake acting to transmit to the brake an applying force at the brake actuator and thereafter acting to maintain the force applied to the brake by a predetermined lesser applying force at the brake actuator and acting to reduce the force applied to the brake when said lesser applying force is reduced.

2. In a vehicle, the combination of a brake, a brake actuator, and means interposed between the brake actuator and brake acting to transmit to the brake an applying force at the brake actuator and thereafter acting to maintain the force applied to the brake by a predetermined lesser applying force at the brake actuator and acted upon by the force applied to the brake to reduce the force applied to the brake when said lesser applying force is reduced.

3. A master cylinder for hydraulic brakes, having a forward compression chamber and a rear compression chamber with a relatively fixed head separating the same, a plunger having an extension of reduced diameter sliding through the fixed head and having a piston head of larger diameter working in the rear chamber, check means associated with the fixed head permitting liquid under pressure to pass through into the forward compression chamber but checking return flow of the same, said forward chamber having an outlet leading to the brakes, said plunger operating on the forward stroke to force liquid from the rear chamber into the forward chamber and thereby raise the pressure in the forward chamber, said parts cooperating so that a slight rearward movement of the plunger after the pressure has developed, relieves the pressure in the rear chamber and enables the pressure in the forward chamber to be sustained by exerting a reduced force on the plunger.

4. A master cylinder for hydraulic brakes, having a forward compresssion chamber and a rear compression chamber with a relatively fixed head separating the same, a plunger having an extension of reduced diameter sliding through the fixed head and having a piston head of larger diameter working in the rear chamber, check means associated with the fixed head permitting liquid under pressure to pass through into the forward compression chamber but checking return flow of the same, said forward chamber having an outlet leading to the brakes, said plunger operating on the forward stroke to force liquid from the rear chamber into the forward chamber and thereby raise the pressure in the forward chamber, said parts cooperating so that a slight rearward movement of the plunger after the pressure has developed, relieves the pressure in the rear chamber and enables the pressure in the forward chamber to be sustained by exerting a reduced force on the plunger, and means for establishing communication between the forward and rear chambers when the plunger is in its retracted position.

EUGENE G. CARROLL.